May 17, 1960 F. J. CARSON 2,936,550
APPARATUS FOR PRODUCING BENT SHEETS
Original Filed April 7, 1954 3 Sheets-Sheet 1
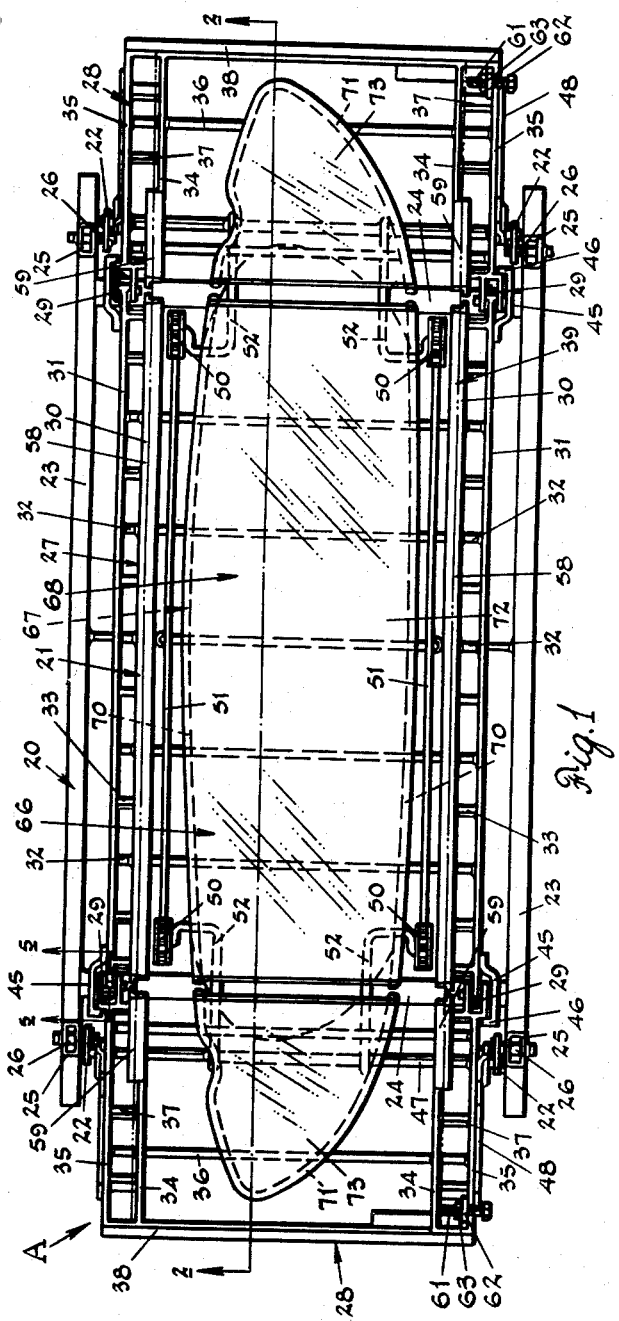
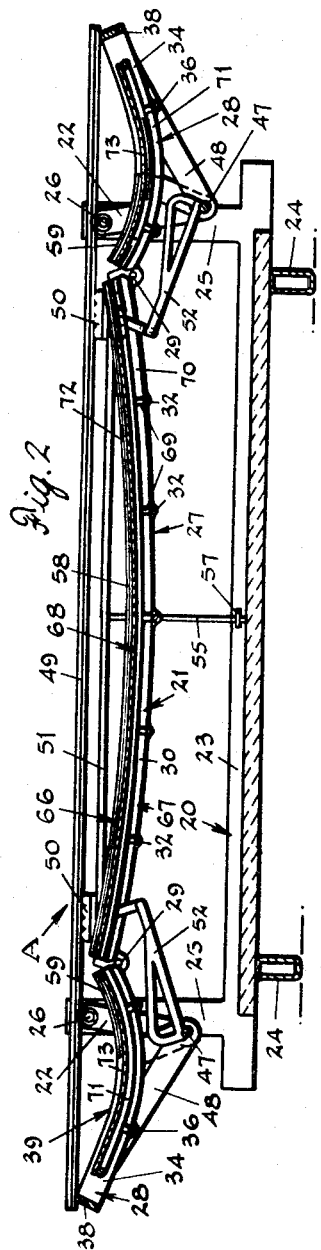
INVENTOR.
Frank J. Carson
BY
Nobbe & Swope
ATTORNEYS

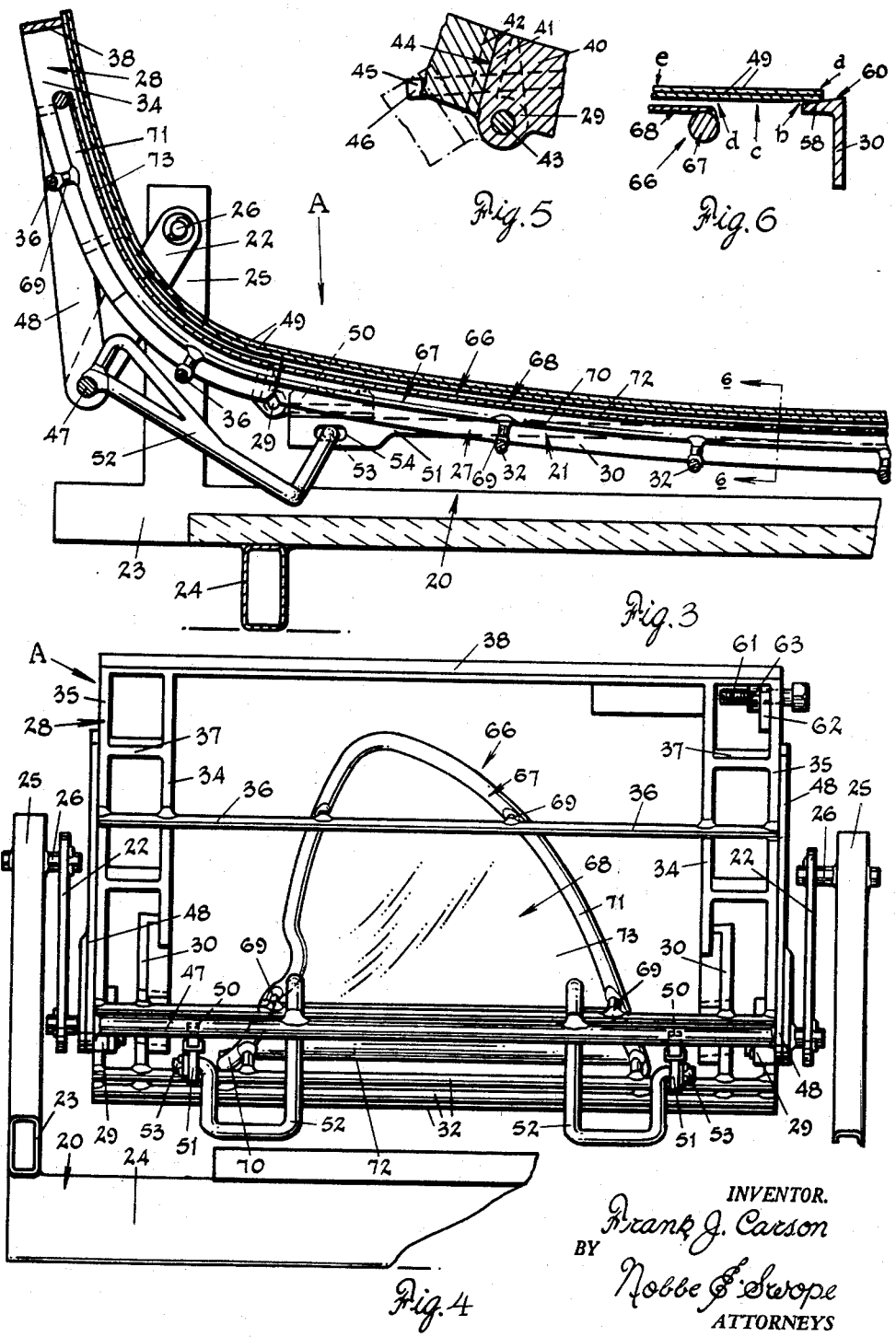

May 17, 1960  F. J. CARSON  2,936,550
APPARATUS FOR PRODUCING BENT SHEETS
Original Filed April 7, 1954  3 Sheets-Sheet 3
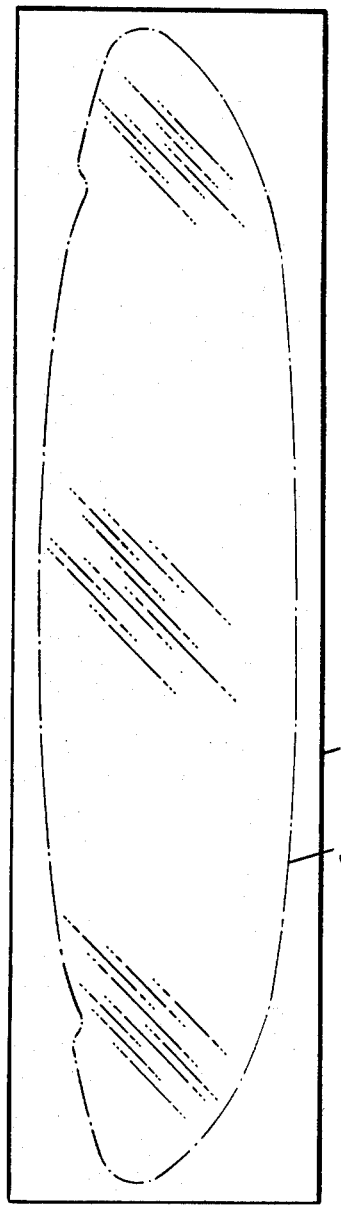
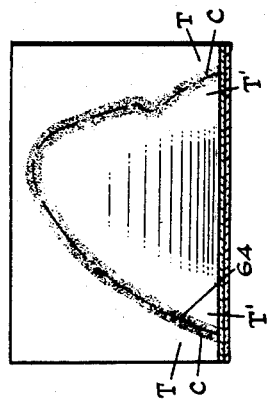
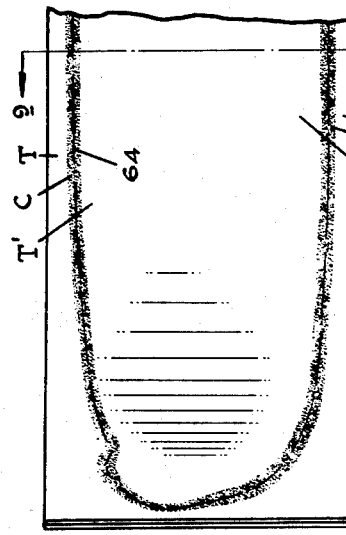
INVENTOR.
Frank J. Carson
BY
Nobbe & Swope
ATTORNEYS

United States Patent Office 2,936,550
Patented May 17, 1960

2,936,550
APPARATUS FOR PRODUCING BENT SHEETS

Frank J. Carson, Toledo, Ohio, assignor to Libbey-Owens-Ford Glass Company, Toledo, Ohio, a corporation of Ohio Original application April 7, 1954, Serial No. 421,650. Divided and this application May 24, 1957, Serial No. 661,490

5 Claims. (Cl. 49—67)

This invention relates broadly to the bending of sheets or plates of glass. More particularly, the invention has to do with an improved apparatus for bending and annealing glass sheets to predeterminedly locate areas of differing physical characteristics of the glass in articles to be subsequently produced therefrom.

This application is a division of application Serial No. 521,650, filed April 7, 1954.

Glass, when properly cooled or annealed, reaches a state of stability in which the characteristics of tension and compression are said to be in equilibrium. These characteristics, however, are known to localize in areas or regions within the glass body particularly when it is bent since the body, in planular form or outline, must be adequately supported to produce the bent formation. Thus in the vicinity of those portions of a bending mold in intimate contact with the glass, there will inevitably be developed regions of tension as distinguished from regions of compression in areas of the glass which are more readily subject or exposed to the controlled temperatures within the cooling zone of a furnace. This arises from the fact that the residual heat of the bending mold counteracts the normal tendency of the glass to uniformly cool or anneal and in consequence, there will be particularly marginal areas which are held at a higher heat for a longer period of the cooling time. A glass sheet, or portions thereof which are in compression, has been found to withstand normal handling and installation more readily than glass structurally in tension.

Advantage of this phenomena of glass may be employed in the manufacture of certain "end-products" by the provision of equipment by means of which the desired areas of tension and compression can be practically predetermined. As herein set forth, it is proposed to establish a known region of compression in a glass sheet after bending so that in its ultimate use the edges thereof will exhibit a desired physical resistance to chipping or breakage. For example, a glass sheet intended to be laminated to form safety glass, in normal production is subjected to various stages of handling, cutting, pressing and subsequently installation. Laminated glass is of course made up of two sheets of glass with an interposed layer of non-brittle thermoplastic material, such as polyvinyl butyral, therebetween.

These sheets are matched and, in the case of an automotive curved windshield, are preferably bent in pairs so that their curvature will be identical. With the increasing demand for the considerably larger one-piece windshield, larger and more complicated bending molds have come into use and considerable emphasis has been placed on adequate supporting devices to prevent the sheets from shifting relative to the mold or one another and thereby becoming mis-matched or out-of-register in the final laminating assembly. Another approach toward solution of producing well-matched bent sheets has been to bend the paired sheets in block size; or, in other words, bend substantially rectangular blank sheets of glass before they are pattern-cut to the required outline for the opening in the automobile body. Obviously when the sheets are initially pattern-cut and then bent, any movement of one sheet relative to the other will prevent satisfactory final registration around the entire perimeter whereas when the sheets are bent before pattern cutting, the pattern is removed from areas of the bent, blank size sheet having an identical curvature with a consequent registration of their edges.

Now, according to this invention, it is proposed to located a marginal area of compression about the bent glass sheets that are pattern-cut in this way, and to obtain this area as a predeterminedly arranged region or zone during the bending and subsequent annealing of the blank size glass sheets. To this end, a bending apparatus of the character to be herein described has been developed.

It therefore is an aim of this invention to provide an improved bending apparatus adapted to control physical changes in a glass body after bending and during the subsequent annealing thereof.

Another object of the invention is to provide an improved bending apparatus for controlling the anneal pattern of a glass body by influencing the cooling rate thereof and whereby it becomes possible to predeterminedly establish a desired characteristic strain pattern in the perimeter area of an outline to be removed therefrom.

Another object of the invention is to provide a bending apparatus of the above character which is adapted to control the annealing rate of the glass body to establish predetermined zones of tension and compression, the zones being oriented according to a defined path through which an outline may be subsequently cut.

Another object of the invention is to provide an improved bending apparatus of the above character which, after heating and bending of a glass sheet or sheets, is adapted to retard the cooling of the glass in continuous and spaced areas and to expose a continuous space therebetween to normal cooling whereby the cut edges or perimeter of a patterned outline cut along and within said normally cooled space will retain desired physical characteristics of the glass.

A further object of this invention is to provide a bending apparatus including an outline type bending mold that acts as a thermal barrier to heat given off from the bent sheet during annealing, and an additional or compensating thermal barrier associated with the mold and so arranged relative thereto as to create distinguishably different physical areas in the glass sheets bent and subsequently annealed on the mold.

Still another object of the invention is to provide a bending apparatus for shaping glass sheets in substantially rectangular blank size, said apparatus having a continuous surface corresponding to the required curvature and a thermal barrier in the form of a heat retaining member comparable in outlined area to a pattern to be cut from said sheets; said surface and heat retaining member cooperating to influence the rate of annealing of the glass sheets, after bending, to producing predetermined areas of the differing physical characteristics of tension and compression whereby the edges of the pattern cut therefrom will retain a definite characteristic of compression.

Other objects and advantages of the invention will become more apparent during the course of the following description when read in connection with the accompanying drawings.

In the drawings, wherein like numerals are employed to designate like parts throughout the same:

Fig. 1 is a plan view of one form of bending apparatus, constructed in accordance with the invention and showing a hinged type mold in open position;

Fig. 2 is a vertical, longitudinal sectional view substantially along the line 2—2 of Fig. 1;

Fig. 3 is an enlarged view of the one end of the apparatus of Fig. 2, showing the mold in the closed position;

Fig. 4 is an end elevation of the apparatus of Fig. 1;

Fig. 5 is an enlarged, fragmentary sectional view through one of the hinges of the mold taken substantially along the line 5—5 of Fig. 1;

Fig. 6 is an enlarged detail view through a side of the mold, taken substantially along the line 6—6 of Fig. 3;

Fig. 7 is a plan view of a blank or block size of a glass sheet required for carrying out the present invention and illustrates a predetermined pattern to be generally removed therefrom;

Fig. 8 is a plan view of a half of the block size glass sheet after the same has been bent and indicates graphically the anneal pattern therein; and Fig. 9 is a transverse section of the glass sheet of Fig. 8 as taken on line 9—9 thereof.

Present day automotive designers have endeavored to increase the viewing scope or area of an automobile and especially the forward viewing area by providing windshields which span not only the entire front of the vehicle body but also extend through the adjoining corners and even slightly rearward into the side walls thereof.

As heretofore explained, the present invention is predicated on an inherent characteristic of glass, which has lent itself advantageously to a practical improvement in the art of bending glass and in the articles obtained thereby. This characteristic is the capacity of glass to physically respond to phases of heating and cooling and thus develop areas of tension and areas of compression; it being recognized that in an over-all area of a glass body at normal temperatures a condition of stability or equilibrium exists wherein tension and compression will be in balance. With particular reference to the bending and subsequent annealing of glass, it has now been ascertained that the support or bending mold, by its construction, can vary the regions within which such areas of tension and compression will develop, by its action as a thermal barrier, during the annealing of the glass subsequently to bending.

In other words, the margins of a glass sheet in contact with a bending mold cannot cool or anneal as rapidly or uniformly as the remainder of the sheet that is out of contact therewith. Hence the residual heat of the mold will create ultimate regions of tension since the cooling rate is hindered as distinct from the remaining areas which, being more or less exposed, respond to the controlled cooling in the leer portion of the bending furnace. Structurally, glass in compression appears to be of a more rugged nature and adapted to withstand the effects of ordinary, normal operations such as cutting, storing, and the pressures to which it is subjected in the formation of laminated or safety glass. Thus it has been found most advantageous to fabricate a laminated windshield from glass which has not only been bent while in the blank size but wherein predeterminedly arranged areas of tension and compression have been set up during annealing and whereby the pattern outline can be located in or cut from the area of a continuous path or region in compression. To accomplish this purpose, rectangular blank size sheets of glass have been satisfactorily bent and then annealed by and on a specially constructed bending apparatus to the end that the ultimately laminated product will more effectively withstand handling, processing and subsequent installation.

Referring now more particularly to the drawings, there is shown in Fig. 1 a bending apparatus A constructed in accordance with this invention and generally comprising a rack or frame 20 and an outline or ring type mold 21 that is carried on the rack 20 by means of links 22 located adjacent the four corners of the apparatus.

The rack 20, generally rectangular in plan, includes side rails 23 arranged in parallel and transversely disposed cross rails 24 which provide the supporting base for the rack. Equidistantly spaced from the ends of the side rails 23 are vertically disposed posts 25 on which the links 22 are pivotally carried by rods 26 secured in the upper ends of the posts and extending horizontally inward therefrom.

According to this invention, a novel bending apparatus is provided to set up certain defined areas in the glass sheet which are distinguishable by special physical characteristics but have no effect on the transparency or optical quality of the glass. To this end the rack 20 and the mold 21 may be constructed along conventional lines to adequately shape the glass sheet to the desired curvature; with associated structure being provided which, together with the mold will act to affect the body of the said sheet by influencing the rate of heat loss to create such defined areas. As herein provided, the mold 21 in plan is of a substantially rectangular form to receive a blank size sheet or sheets of glass and comprises a center section 27 and end sections 28 that are hingedly connected to the center section, at their adjoining ends, by means of hinges generally indicated at 29. In this typical "hinged" mold construction, the end mold sections 28 are freely movable with reference to the center section 27 from the closed position of Fig. 3 to a substantially open position as shown in Figs. 1 and 2. In elevation, and with the mold in its closed position as shown in Fig. 3, the end mold sections 28 rise sharply from the relatively shallow concave curvature of the center section 27 and the points of hinged connection between the mold sections are preferably disposed within the areas of smallest or sharpest curvature.

The center section 27 of the mold is formed by a pair of rails 30 and 31, arranged in parallel and interconnected by transversely disposed rods 32; the rails of each pair being farther interjoined by suitably spaced web members 33. The end sections 28 are similarly formed by pairs of rails 34 and 35 that are interconnected by rods 36 and web members 37. The pairs of rails 34 and 35 at their innermost ends, adjoin and form outward extensions of the center section rails 30 and 31 and at their outermost ends are connected by rails 38. The rails 30, 34 and 38 thus form the actual perimeter of the substantially rectangular mold and are finished on their uppermost edges to provide the continuous shaping surface 39 thereof.

The adjoining ends of the rails 31 and 35 are equipped with component parts of the hinges 29 and, for this purpose, the ends of the rails 31 have affixed thereto or integrally formed therewith a block 40 with a flat, substantially vertically disposed end surface 41. Correspondingly, the ends of rails 35 are provided with forked or bifurcated end portions 42 which receive the adjoining blocks 40 therebetween. The blocks and said bifurcations are suitably drilled to carry a pintle or hinge pin 43. When the mold per se is in the closed position, the flat surface 41 of block 40 is intended to abut the web 44 of the bifurcation 42 and thereby arrest further closing movement. If desired, flexible shim members (not shown) may be affixed to the block 40 to be located as required against the surface 41 to balance the closing of one hinge with the remainder. Also as shown in Fig. 1, hook elements 45, may be affixed to the rails 31, adjacent the blocks 40, and with the inwardly directed ends 46 disposed in relation to the outer surface of the bifurcations 42. Preferably the ends 46 are located to engage the bifurcations when the end mold sections 28 are in their open positions relative to the center mold section 27.

The mold 21 is bodily carried by the links 22 by means of transversely disposed rods 47 mounted in struts 48 that are secured as by welding or like means to the outer surfaces of rails 35 of the respective end sections. The rods are located between the opposite ends of the end mold sections 28 to bring about a balance by which they may be easily moved to the open mold position and return to the closed position of the mold. To some extent, the end mold sections together with the center section 27 are counterbalanced to carry the glass sheets, indicated at 49, when flat and to move downwardly as the glass responds to the heat of the furnace. The rods 47 are carried at their opposite ends in the lower ends of the links 22 and, since the links are pivotally suspended from rods 26, the links are enabled to swing as the mold sections rise to the open position thereby compensating for the elongation of the mold generally.

The glass sheets 49 are supported at their ends on the end rails 38 of the mold sections 28; moreover, prior to bending, the flat sheets are further supported midway of their ends by means of blocks 50 of suitable material, such as marinite or graphite, that are carried on a pair of bars 51. The bars 51 are arranged in spaced, parallel relation to the rails 30 and are supported by brackets 52 that are affixed at their opposite ends to the rods 47. More particularly, the related ends 53 of brackets 52 are bent to substantially a right angle to the body thereof and so as to pass through slots 54 provided in the ends of bars 51. The bars 51 are restrained from end-wise movement by means of rods 55 depending therefrom and which are guided in their vertical movement by horizontally disposed rods having looped ends 57.

The brackets 52 are adapted to move with the rods 47 and end mold sections 28, in moving between the different positions of the mold, and thereby elevate the bars 51 until the blocks 50 thereon will be disposed substantially in a plane extending between the upper surfaces of the end rails 38 when the mold bodily is in the open position. Likewise as the mold sections return to the closed position, the brackets 52 operate to automatically lower the blocks 50 so that as the glass sheets settle toward the shaping surface the blocks are finally brought below the shaping surface 39.

The extent of the influence of the mold 21 upon the annealing of glass sheets bent thereon, is partially determined by the areas of the shaping surface which may be, although are not necessarily, constructed to provide a wide supporting surface at least along the central portions of the opposite sides of the mold. In fact, in practice both a narrow rail-type surface as well as a wide or ledge-type surface has been employed in bending molds, as herein disclosed, with equally good results being obtained. However, by way of illustration, the ledge-type surface as indicated at 58 extends inwardly and downwardly from, and encompasses the entirety of, the rails 30 forming the center section of the shaping surface 39; and has terminal areas 59 on the rails 34 of the end sections 28. This ledge surface is formed by an inverted L-shape and wherein the top surface 60 (Fig. 6) is angled to the horizontal. The advantages of such a shaping surface are set forth in the patent to Bamford et al., No. 2,633,-673, issued April 7, 1953, and assigned to the assignee of this application. For one thing, a surface, angularly disposed to the substantially horizontal plane of the glass sheet being bent, affords only a lower edge corner contact when the sheet is supported thereupon. Moreover, as herein employed, the angled surface also forms a wedge-shaped space between it and the glass which increases from the corner area of contact to the inner edge of the surface 60, the purpose of which will be more fully hereinafter described.

In carrying out operation of the bending apparatus just described, the end mold sections 28 thereof are raised from the closed position with respect to the center mold section 27 through the pivotal action of the hinges 29, interposed between the adjoining ends of the said sections, and as the sections 28 swing or rock on the axes of their related supporting rods 47. During the opening action of the mold to the position of Fig. 1, the center section 27 is elevated by the upward swinging of the end sections 28 and in this related movement the over-all length of the mold becomes elongated; this is accommodated by the swinging action of the links 22 on the rods 26. Also as the end sections are rocked upwardly and outwardly, the pivotal movement of the rods 47 causes the brackets 52 to elevate the bars 51 and the blocks 50 carried thereon. Now when a pair of flat glass sheets 49, in the blank size are loaded onto the open molds, the ends thereof are located on the rails 38 of end sections 28 and the sheets are accurately positioned relative to the shaping surface by means of locator screws 61. These may be threaded into plates 62 secured to the rails 35 of the sections 28 adjacent a corner formed by said rails and end rails 38. The screws 61 are held in their adjusted positions with respect to the shaping surface 39 by lock-nuts 63. The sheets 49 will thus be located in a supported relation above the shaping surface 39 when their ends rest upon the end rails 38 and their longitudinal edges are properly located above the rails 30 and 34 by the locator screws 61.

As the bending apparatus is carried forwardly through the bending zone of a conventional tunnel type furnace, the increasingly high heat softens the glass sheets until they settle by gravity toward the surface 39. By reason of this plastic condition, the central portion of the sheets initiates swinging of the end mold sections inwardly about the axes of the rods 47 so that in a related movement, the brackets 52 are swung downwardly to lower the supporting blocks 50. As the end mold sections approach their closed mold positions, the blocks 50 will have been lowered beneath the plane of the shaping surface 39 to permit settling of the glass sheets thereon. In the extreme end of the bending zone, the end mold sections 28 operate to literally fold the end portions of the glass sheets upwardly so that in their plastic condition they will be suitably bent to the sharply upward rising areas of the curvature to be formed therein.

In passing from the bending zone into the annealing zone of the furnace, the glass sheets are subjected to the influence of the controlled cooling temperatures which is adversely affected by the residual heat within the mold. This is evidenced in several ways and the effect of the residual heat of the mold produces a variable differential to controlled cooling of the glass. Since this differential is most pronounced in the areas of the shaping surface, upon which the glass sheets rest, the immediate areas of the sheets thereon cannot cool as rapidly as adjoining areas not subject to the transmission or influence of the residual heat of the metal.

In other words, the outline mold 21 acts as a thermal barrier but which retards the normal cooling of the portions of the bent glass sheet, or sheets, that lie immediately thereabove. Consequently local regions of tension will be created in these areas during the annealing of the bent sheet on the mold while, at the same time, corresponding areas of compression will be created at a distance from the tension areas.

It is the primary aim of this invention to utilize this phenomenon to create a compression band of predetermined location, pattern and extent on a bent and annealed blank size sheet, along which said sheet can be pattern-cut to remove a section therefrom that will have a compression band extending entirely around its perimeter.

Thus, in carrying out the invention, the general outline of an article to be produced, for example a windshield, is combined with the generated curvature of the blank size sheet to establish a flat planning outline of the actual area or band involved. Graphically illustrated, such an outline, for a windshield, may be as indicated by the broken line 64 on the blank size sheet 65 in Fig. 7. A desired band of compression may then be determined by arbitrarily establishing a continuous path C within which the outline, indicated by the broken line 64, is medially located, as is shown in Figs. 8 and 9.

The compression band C may be created during annealing of a bent glass sheet on the mold 21 by the provision of another thermal barrier, in addition to that resulting from the presence of the rails 30 and ledges 58 of the outline mold 21, and which is positioned inwardly of the shaping surface 39 and inwardly of the line 64 along which the bent sheet is to be cut.

The additional thermal barrier may be of any suitable type. For example, it may act to either reflect heat, or to retain or temporarily store heat; or, it may combine both actions. The primary requirement is that it must act in a similar manner to the outline mold 21 in retarding the cooling of the bent sheet during annealing, without adversely affecting the bending of the sheet.

For the purpose of illustration, a special type of heat retaining body or member 66 is provided as the additional thermal barrier in the drawings.

This member 66 substantially approximates the pattern outline or section to be cut from each of the sheets 49, although it is smaller in area, and is preferably made up of a relatively massive continuous bar 67 and a relatively thin membrane in the form of a shield or plate 68 fixedly secured to said bar, and substantially filling the space surrounded thereby. It will of course be appreciated that bodies of various cross-section may be employed to make up the bar 67 which may be supported by posts 69 on the rods 32 and 36. As shown, the bar encloses a center area described by sections 70 and end areas formed by sections 71; the central sections 70 being supported by posts 69 on the rods 32 while each of the end sections 71 are similarly supported from rods 36. The membrane or shielding plate 68 is formed by three sections 72 and 73, complementary to each of the bar sections 70 and 71 whereby the related bar sections 70 and 71 and membrane or plate sections 72 and 73 are freely movable with their associated mold sections 27 and 28. Accordingly when the mold is in the open position of Fig. 1, the adjoining end edges of the bars 70 and 71 as well as of the plate sections 72 and 73 will be spaced apart; however, when the mold sections are in the closed position of Fig. 3, said end edges of the sections of the rails and of membrane 68 will engage to complete the scope of the area which the complete heat retaining body 66 is intended to occupy.

As has already been explained, the heat retaining body 66 is located inwardly of the shaping surface 39 and is formed to an outline generally smaller but conforming to the desired pattern to be cut from the sheets. Therefore, while the areas of the glass sheets between the rails 30, 34 and 38 and the heat retaining body or member 66 are enabled to cool or anneal uniformly, the adjoining area, particularly above the bar 67 forming the perimeter of said member, will be subjected to the effects of the residual heat therein. Since the centrally thin area or membrane 68 further maintains this heat condition although to a lesser degree, the corresponding central areas of the sheets will be increasingly less subject to the residual heat and will consequently be more subject to gradual, though somewhat retarded, cooling.

Consequently, when the bending apparatus reaches the unloading end of the furnace, the glass sheets will have cooled to substantially room temperature but the delayed cooling in the predeterminedly arranged areas of the sheets will have created regions that will appear in tension as distinct from that continuous path or region C that is in compression.

The graphic representation of Figs. 8 and 9 are typical of glass sheets, bent and annealed on the bending apparatus of this invention, when viewed through a polariscope using a color filter. It will be seen there that the effective areas of the mold formed by the shaping surface of the rails and ledges have so retarded the cooling of the abut margins, during annealing as to create a marginal region of tension as indicated at T in Figs. 8 and 9. As indicated, the shaded area at C represents the greatest concentration of compression while the area inwardly thereof portrays adjoining areas of tension as at T'. This inner area of tension T' conforms generally to the outline indicated by broken line 64 and is created by employing the thermal barrier 66 that is substantially smaller than the area bounded by line 64. The extent of region T particularly along the longitudinal outer margins of the bent sheet accordingly corresponds to the length and width of the shaping surface 39 on rails 30 and the width of the rails 34 and 38 which complete the outermost portions of the end mold sections 28. Likewise the region T' indicates a tension path descriptive of the outline of the heat retaining body and the heaviest concentration may be created by increasing the marginal thickness of such a body, as by the bar 67 from the nominally thin central portion or area thereof, as by the plate 68.

Now, between the areas T and T' there is provided the compression region, designated C, which is continuous throughout the ends of the bent sheet in correspondence with the outline of the pattern; and, since the line 64, on which the actual pattern is to be scored, was originally determined so as to fall within this region C the entire margin edge of the glass section, obtained by making a pattern-cut along this line, will retain physical strain characteristics typical of compression.

It is believed that the structure of the complete bending apparatus of the invention may now be fully comprehended. Thus, referring to Fig. 6, it will be seen that the corner of the lowermost of a pair of glass sheets 49 is supported on the ledge-type surface 58 when the sheets are fully bent and the mold is in its closed position and when the bending apparatus has been conveyed from the high heat of the furnace bending zone to the controlled temperature of the cooling or annealing zone. At this phase of the bending operation, the glass begins to lose heat according to the controlled and gradually reduced temperature of the cooling zone. It is also at this phase of operation that the effectiveness of the apparatus becomes predominate. Thus the residual heat of the rail 30 which exists in the ledge-type surface 58 is transmitted to the edges of the sheets carried thereon as at $a$. Now, since the surface 58 is angled downwardly therefrom as at $b$, transmission of this residual heat is increasingly diminished inwardly of the sheet surface until at $c$ the sheet is completely exposed to ambient air and can cool in agreement therewith.

Inwardly thereof, this area $c$ is shut off or diminished by the location of the bar 67 which operates to transmit residual heat again as at $d$ into the glass sheets and reduce their response to cooling. The bar 67 and shielding plate 68 are spaced from the under-surface of the lowermost sheet 49 to reduce the counteractive effect to the residual heat. However, it is intended, by reason of the relatively large area of glass located within the area enclosed by the bar 67, to produce as at $e$ a gradually reduced or modulated condition of heat retention to the end that exposure of this surface area to the cooling effects maintained within the zone will effect an eventually stabilized physical condition substantially midway between the structural characteristics of tension and compression. This may also be broadly defined as an area wherein tension and compression merge.

Referring again to the terms "tension" and "compression" in relation to the areas $a$, $b$, $c$, $d$ and $e$, it will become apparent that by the location of a heat absorbing and retaining body, as the rail 30, along and in supporting contact with the marginal edges of the sheet a region of tension in the finally bent and annealed sheets will originate at "$a$" and will gradually reduce through the area $b$ until it vanishes or blends into a region of compression as at $c$ which becomes possible by uniform exposure of the glass surfaces to the cooling air. This region of compression, however, then merges inwardly into a second region of tension as at $d$ where the influence of residual heat in the rail 67 becomes apparent. Since the bar 67 and membrane or plate 68 are spaced beneath the surface of the lowermost sheet 49 and in addition the membrane is comparatively thinner than the mass of bar 67, the effect of the rail to retain and give off heat or to reduce the rate of cooling diminishes inwardly so that the central area of the sheets gradually undergoes an annealing phase wherein tension and compression become balanced, or, otherwise stated, when the glass is finally cooled are in equilibrium. Of course, when the bending apparatus reaches the end of the furnace, the sheets are generally cooled to room temperature and the physical characteristics thereof in their entirety become stabilized.

When such bent and annealed sheets are scored along a path indicated by the line 64 (Figs. 7 to 9), the edges of the section thus obtained will possess the physical characeristics of compression so that a laminated or safety glass windshield, may be formed therefrom by ordinary laminating procedures and can be more satisfactorily handled both during lamination and the ultimate installation.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

I claim:

1. A bending mold for bending glass sheets, comprising a center section and a pair of movable end sections pivotally connected to said center section, a frame, pivoted members connecting said end sections to said frame and mounting said mold sections for movement from an opened to a closed position, a movable sheet support located intermediate the extremities of the said movable end sections, a sheet engaging member carried by said sheet support, and actuating means connecting said sheet support to each of said pair of movable end sections to move said sheet support with said pair of end sections from an elevated position in the open mold position to a lowered position in the closed mold position.

2. A bending mold for bending glass sheets as defined in claim 1, wherein the sheet support includes a bar having openings formed therein, and the actuating means comprises arms carried by the movable mold sections, said arms having portions thereof movably received within said openings.

3. A bending mold for bending glass sheets as defined in claim 1, wherein a guide member is carried by the sheet support, and guide means engageable with said guide member for guiding the movement of said sheet support member.

4. In a mold for bending glass sheets, comprising a pair of oppositely disposed end sections, a center section, said end sections being pivotally connected to said center section and movable from an open position to a closed position, a frame, pivoted members connecting said end sections to said frame and supporting said center and end sections, a pair of spaced movable sheet supports located intermediate the extremities of the end sections, a pair of spaced arms carried by each of said end sections having end portions movable with the end sections from an elevated position in the open mold position to a lowered position in the closed mold position, and means connecting each of said movable sheet supports to the end portions of the arms carried by each of said pair of end sections whereby the movable sheet supports are moved from the elevated position to the lowered position when the end sections are moved to closed position.

5. In a mold for bending glass sheets as claimed in claim 4, wherein the movable sheet supports are located in spaced parallel relationship along opposite sides of the center section.

References Cited in the file of this patent
UNITED STATES PATENTS

| | | |
|---|---|---|
| 760,959 | Connington | May 24, 1904 |
| 833,436 | Borland et al. | Oct. 16, 1906 |
| 2,702,445 | Jendrisak | Feb. 25, 1955 |
| 2,774,189 | Jendrisak | Dec. 18, 1956 |

UNITED STATES PATENT OFFICE

CERTIFICATE OF CORRECTION

Patent No. 2,936,550 May 17, 1960

Frank J. Carson

It is hereby certified that error appears in the printed specification of the above numbered patent requiring correction and that the said Letters Patent should read as corrected below.

Column 1, line 22, for "521,650" read -- 421,650 --; column 6, line 50, strike out "but"; line 75, for "The" read -- This --.

Signed and sealed this 18th day of October 1960.

(SEAL)

Attest:
KARL H. AXLINE
Attesting Officer

ROBERT C. WATSON
Commissioner of Patents